Patented Mar. 14, 1933

1,901,515

UNITED STATES PATENT OFFICE

WINFRID HENTRICH, OF ERLANGEN, ANTON OSSENBECK, OF COLOGNE-MULHEIM, AND ERNST TIETZE, OF COLOGNE-ON-THE-RHINE, GERMANY, ASSIGNORS TO GENERAL ANILINE WORKS, INC., OF NEW YORK, N. Y., A CORPORATION OF DELAWARE

DIARYLSULPHONE-AZODYESTUFFS

No Drawing. Application filed May 19, 1931, Serial No. 538,628, and in Germany May 24, 1930.

The present invention relates to new azo-dyestuffs, more particularly it relates to dyestuffs which may be represented by the probable general formula:

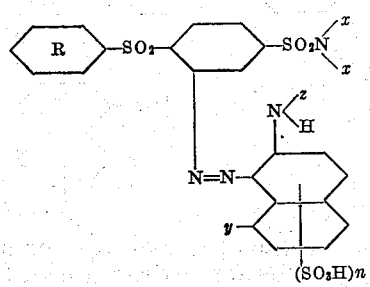

wherein $x$ stands for hydrogen or an alkyl group, $y$ stands for hydrogen or a hydroxy group, $z$ stands for hydrogen or alkyl, $n$ stands for one of the numbers one and two, and wherein the benzene nucleus R may be substituted by monovalent substituents, such as halogen, the alkyl-, alkoxy-, hydroxy- and carboxylic acid group.

Our new dyestuffs are obtainable by diazotizing in the usual manner a 2-amino-diaryl-sulphone containing in the amino-substituted benzene nucleus a sulphamino group, the hydrogen atoms of which may be substituted by alkyl, said sulphamino group standing in paraposition to the sulphone bridge, and coupling an acid medium with a 2 - amino- or alkylamino - naphthalene - sulphonic acid or a 2-amino- or alkylamino-8-hydroxynaphthalene-sulphonic acid.

The new dyestuffs are in form of their alkali metal salts generally dark red powders, soluble in water, dyeing wool from an acid bath generally red shades of good fastness properties. The dyestuffs containing in the 2-amino-diarylsulphone-sulphonic acid amide component a hydroxy- and carboxylic acid group in ortho-position to one another in the benzene nucleus not containing the amino group are valuable dyestuffs for after-chroming.

As compared with similar known dyestuffs the new sulphone-sulphonic acid amide dyestuffs are distinguished particularly by possessing a considerably improved capacity for even dyeing while retaining fastness to washing, fulling, perspiration and light.

The invention is illustrated by the following examples, without being limited thereto:

*Example 1.*—386 parts by weight of 2-amino-4'-hydroxy - diphenyl - sulphone - 4 - sulpho - N - monomethylamide - 3'-carboxylic acid, obtainable by the condensation of sulphino-salicylic acid with 2-nitro-1-chlorobenzene - 4 - sulpho - N - monomethylamide (prepared by acting on 1-nitro-2-chlorobenzene-5-sulphonic acid with phosphorus pentachloride and treating the sulphochloride with methylamine) and subsequent reduction, are diazotized in the customary manner. The diazo compound is coupled in weakly mineral acid solution with 238 parts by weight of 2-amino-8-hydroxynaphthalene - 6 - sulphonic acid. When the formation of the dyestuff having in its free state the following formula:

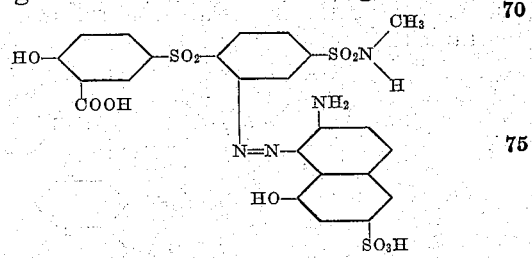

is complete, the solution is rendered alkaline, and the dyestuff formed is salted out with sodium chloride. It dyes wool after chroming red shades fast to light and fulling and of satisfactory evenness.

*Example 2.*—340 parts by weight of 2-amino-4'-methyl-diphenylsulphone-4-sulpho-N-monoethylamide (prepared by condensing in aqueous alcoholic solution 1-chloro-2-nitrobenzene-4-sulpho-N-monoethylamide with para-toluene-sulphinic acid and reducing the nitro group in the usual manner with iron and acetic acid) are diazotized and coupled in acid solution with 237 parts by weight of 2-methylaminonaphthalene-7-sulphonic acid. The working up of the dyestuff having in its free state the following formula:

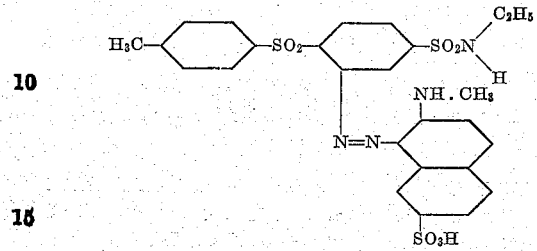

is carried out in the customary manner.

It dyes wool in an acid bath a vivid red; the dyeing is very fast to light and fulling and possesses moreover very good evenness.

Dyestuffs of similar properties are obtained by using as diazo components 2-amino-4'-methyl-diphenyl-sulphone-4-sulphonamide (prepared by condensing in aqueous alcoholic solution 1-chloro-2-nitrobenzene-4-sulphonamide with para-toluene sulphinic acid and reducing the nitro group in the usual manner with iron and acetic acid), 2-amino-4'-chloro-diphenylsulphone-4-sulphon-dimethylamide (prepared by condensing in aqueous alcoholic solution 1-chloro-2-nitrobenzene-4-sulphon-dimethylamide with chloro-benzene-para-sulphinic acid and reducing the nitro group in the usual manner with iron and acetic acid), and other 2-amino-diaryl-sulphone-sulphonamides. The 2-methylaminonaphthalene-7-sulphonic acid can be replaced by other sulphonic acids of 2-aminonaphthalene, for example by the 2-aminonaphthalene-4.7-disulphonic acid.

*Example 3.*—When in Example 1 the sulphino-salicylic acid is replaced by the sulphino-ortho-cresotinic acid and the process is carried out in a similar manner, a dyestuff having in its free state the following formula:

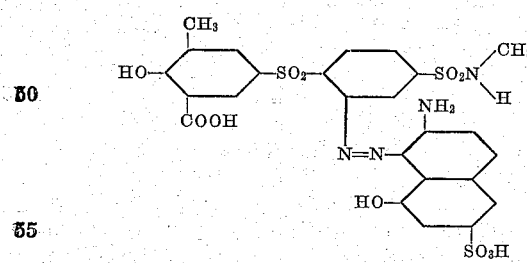

is obtained of properties which are quite analogous to those of the product described in Example 1.

Likewise other sulphinic acids, containing the salicylic acid grouping, are suitable for this purpose.

*Example 4.*—The dyestuff obtained by acid coupling 2-amino-4'-hydroxy-diphenylsulphone-4-sulphonamide-3'-carboxylic acid, (prepared by condensing in aqueous alcoholic solution 1-chloro-2-nitro-benzene-sulphonamide with 4-sulphino-salicylic acid and reducing the nitro group in the usual manner with iron and acetic acid) with 2-amino-8-hydroxynaphthalene-6-sulphonic acid is, after dyeing on wool and chroming, quite similar in shade and fastness properties to that described in Example 1. In its free state it corresponds to the following formula:

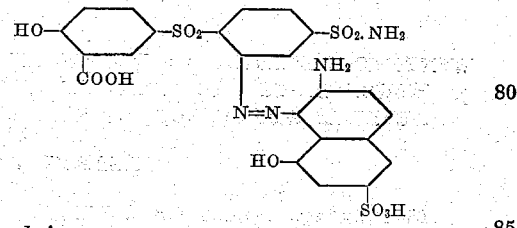

We claim:

1. The azodyestuffs of the probable general formula:

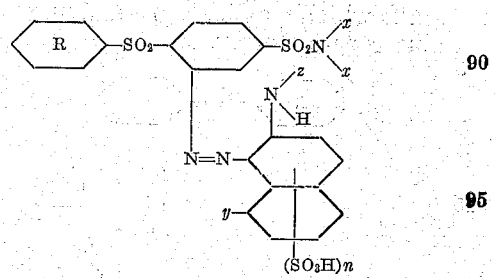

wherein $x$ stands for hydrogen or an alkyl group, $y$ stands for hydrogen or a hydroxy group, $z$ stands for hydrogen or an alkyl group, $n$ stands for one of the numbers one and two, and wherein the benzene nucleus R may be substituted by monovalent substituents selected from the group consisting of halogen, an alkyl-, an alkoxy-, the hydroxy- and the carboxylic acid group, being in the form of their alkali metal salts generally dark red powders, soluble in water and dyeing wool from an acid bath generally red shades of good fastness properties.

2. The azodyestuffs of the probable general formula:

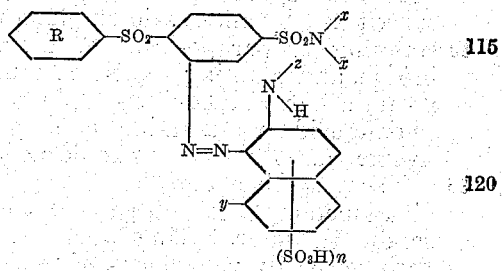

wherein $x$ stands for hydrogen or an alkyl group, $y$ stands for hydrogen or a hydroxy group, $z$ stands for hydrogen or an alkyl group, $n$ stands for one of the numbers one and two, and wherein the benzene nucleus R may contain a hydroxy- and carboxylic acid group in ortho-position to one another, as substituents, being in the form of their alkali metal salts generally dark red powders, soluble in water and dyeing wool from an acid bath generally red shades of good fastness properties.

3. The azodyestuffs of the probable general formula:

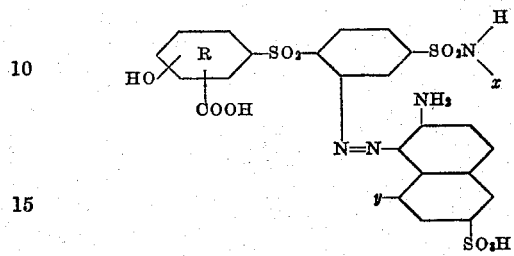

wherein $x$ stands for hydrogen or alkyl, $y$ stands for hydrogen or a hydroxy group and wherein the hydroxy- and carboxylic acid groups in the benzene nucleus R stand in ortho-position to one another, being in the form of their alkali metal salts generally dark red powders, soluble in water and dyeing wool from an acid bath generally red shades of good fastness properties.

4. The axodyestuffs of the following formula:

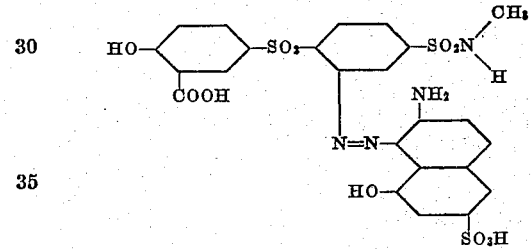

dyeing wool after chroming red shades fast to light and fulling and of satisfactory evenness.

5. The azodyestuff of the following formula:

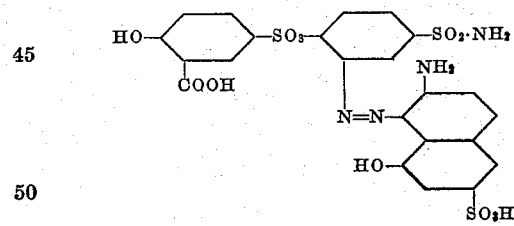

dyeing wool after chroming red shades fast to light and fulling and of satisfactory evenness.

In testimony whereof, we affix our signatures.

WINFRID HENTRICH.
ANTON OSSENBECK.
ERNST TIETZE.